United States Patent
Schulte

(10) Patent No.: US 8,786,128 B2
(45) Date of Patent: Jul. 22, 2014

(54) TWO-WIRE INDUSTRIAL PROCESS FIELD DEVICE WITH POWER SCAVENGING

(75) Inventor: John P. Schulte, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 597 days.

(21) Appl. No.: 13/098,678

(22) Filed: May 2, 2011

(65) Prior Publication Data

US 2011/0282467 A1    Nov. 17, 2011

Related U.S. Application Data

(60) Provisional application No. 61/333,508, filed on May 11, 2010.

(51) Int. Cl.
  *H02J 1/00*  (2006.01)
(52) U.S. Cl.
  USPC ............................. 307/1; 340/310; 340/538
(58) Field of Classification Search
  None
  See application file for complete search history.

(56) References Cited

U.S. PATENT DOCUMENTS

| | | | |
|---|---|---|---|
| 4,015,609 A | 4/1977 | Mensink et al. | 128/419 PG |
| 4,206,297 A | 6/1980 | Hoff et al. | 323/22 |
| 4,206,397 A | 6/1980 | Dahlke | 323/22 |
| 4,413,224 A | 11/1983 | Krupka et al. | 323/222 |
| 4,502,318 A | 3/1985 | Converse, III et al. | 73/3 |
| 4,606,076 A | 8/1986 | Davis | 455/343 |
| 4,621,551 A | 11/1986 | Silverman | 82/31 |
| 4,755,773 A | 7/1988 | Ohmagari | 332/9 |
| 4,804,958 A | 2/1989 | Longsdorf | 340/860 |
| 4,833,922 A | 5/1989 | Frick et al. | 73/756 |
| 4,866,435 A | 9/1989 | Frick | 340/870.16 |
| 4,889,179 A | 12/1989 | Merenda | 165/14 |
| 4,916,381 A | 4/1990 | Gelecinskyj | 323/285 |

(Continued)

FOREIGN PATENT DOCUMENTS

| | | |
|---|---|---|
| DE | 4021258 A1 | 1/1991 |
| EP | WO94/01764 | 1/1994 |

(Continued)

OTHER PUBLICATIONS

Notification of Reasons for Rejection (First Office Action) dated Oct. 16, 2013 in Japanese Appln. No. 2013-510196, filed Nov. 9, 2012. 7 pgs including English Translation.

(Continued)

*Primary Examiner* — Jared Fureman
*Assistant Examiner* — Terrence Willoughby
(74) *Attorney, Agent, or Firm* — Westman, Champlin & Koehler, P.A.

(57) ABSTRACT

A process field device for use in monitoring or controlling an industrial process includes first and second loop terminals configured to couple to a two-wire industrial process control loop. Field device circuitry is configured to monitor or control a process variable of the industrial process. The field device circuitry is powered by power connections from the two-wire industrial process control loop. A current regulator is connected in series with the two-wire industrial process control loop, the first and second loop terminals and the field device circuitry. The current regulator is configured to control a loop current flowing through the two-wire process control loop. A voltage regulator is connected in parallel with the current regulator and in series with the two-wire industrial process control loop, first and second loop terminals and field device circuitry. The voltage regulator is configured to control a voltage across the field device circuitry.

18 Claims, 7 Drawing Sheets

(56) References Cited

U.S. PATENT DOCUMENTS

| | | | |
|---|---|---|---|
| 4,970,451 A | 11/1990 | Suomalainen | 323/222 |
| 5,087,871 A | 2/1992 | Losel | 323/299 |
| 5,089,974 A | 2/1992 | Demeyer et al. | 364/492 |
| 5,146,401 A | 9/1992 | Bansal et al. | 364/138 |
| 5,179,488 A | 1/1993 | Rovner | 361/18 |
| 5,184,094 A | 2/1993 | Kohler | 331/158 |
| 5,187,474 A | 2/1993 | Kielb et al. | 340/870 |
| 5,245,333 A | 9/1993 | Anderson et al. | 340/870 |
| 5,258,868 A | 11/1993 | Jensen et al. | 359/168 |
| 5,333,114 A | 7/1994 | Warrior et al. | 364/550 |
| 5,360,997 A | 11/1994 | Watson | 323/268 |
| 5,377,090 A | 12/1994 | Steigerwald | 363/20 |
| 5,437,178 A * | 8/1995 | Esin et al. | 73/1.82 |
| 5,535,243 A | 7/1996 | Voegele et al. | 375/259 |
| 5,541,860 A | 7/1996 | Takei et al. | 702/141 |
| 5,606,513 A | 2/1997 | Louwagie et al. | 364/510 |
| 5,610,552 A | 3/1997 | Schlesinger et al. | 327/560 |
| 5,659,206 A | 8/1997 | Taguchi et al. | 307/11 |
| 5,710,552 A | 1/1998 | McCoy et al. | 340/870.21 |
| 5,764,891 A | 6/1998 | Warrior | 395/200.2 |
| 5,973,942 A | 10/1999 | Nelson et al. | 636/21.01 |
| 6,178,101 B1 | 1/2001 | Shires | 363/39 |
| 6,313,616 B1 | 11/2001 | Deller et al. | 323/282 |
| 6,489,755 B1 | 12/2002 | Boudreaux et al. | 323/282 |
| 6,577,516 B1 | 6/2003 | Thoren et al. | 363/84 |
| 6,646,362 B2 | 11/2003 | Bert et al. | 307/130 |
| 6,806,693 B1 | 10/2004 | Bron | 323/280 |
| 6,813,318 B1 | 11/2004 | Westfield et al. | 375/295 |
| 6,897,639 B2 * | 5/2005 | Koernle et al. | 323/277 |
| 7,187,158 B2 | 3/2007 | Huisenga et al. | 323/282 |
| 7,548,072 B2 * | 6/2009 | Griessbaum et al. | 324/644 |
| 2002/0101748 A1 | 8/2002 | Loechner | 363/84 |
| 2005/0030185 A1 | 2/2005 | Huisenga et al. | 340/635 |
| 2005/0231182 A1 | 10/2005 | Huisenga et al. | 323/282 |
| 2005/0289276 A1 | 12/2005 | Karschnia et al. | 710/305 |
| 2007/0152645 A1 | 7/2007 | Orth | 323/275 |
| 2008/0094045 A1 * | 4/2008 | Lin | 323/274 |
| 2009/0309558 A1 | 12/2009 | Kielb | 323/234 |

FOREIGN PATENT DOCUMENTS

| | | |
|---|---|---|
| EP | 0 529 391 A1 | 6/1998 |
| GB | 2229897 A | 3/1990 |
| WO | WO 02/09268 | 1/2002 |
| WO | WO 2005/017544 | 2/2005 |
| WO | WO 2007/078604 | 7/2007 |
| WO | WO 2009/114064 | 9/2009 |

OTHER PUBLICATIONS

Brochure: "Preliminary LTC1149, LTC1149-3.3., LTC 1149-5; High Efficiency Synchronous Stepdown Switching Regulator", Linear Technology Corp. Milpitas, CA, pp. 1-16, Nov. 1992.
Ullrich Von Seckendorff and Karen Speers, "Selecting an Inrush Current Limiter," Electronic Products, Jan. 1995, pp. 25-33.
"Electronics Letters an International Publication," The Institution of Electrical Engineers, Aug. 29, 1996, vol. 32, No. 18, pp. 1629-1632.
"LM193/LM293/LM393/LM2903 Low Power Low Offset Voltage Dual Comparators", National Semiconductor, pp. 1-12, Jan. 1995.
"LT124/Series High Speed Current Mode Pulse Width Modulators," Linear Technology LT1241 Series, pp. 1-16, 1992.
A.S. Koslovski, "Fast Active Inrush Current Limiter for Boost-based Resistor Emulators," 16th International Telecommunications Energy Conference, Intelec '94, Vancouver, B.C., Canada, pp. 649-652, Oct. 30, 1994.
Schematic: Power supply circuited used in a process control transmitter which is believed to have been on sale more than one year prior to the filing of the present application, date is prior to Aug. 2011.
EPO Communication pursuant to Rules 161(1) and 162 EPC for Application No. 097209.4.3-1239 _PCT/US2009/001037 filed Feb. 19, 2009; date Oct. 19, 2010, 2 pages.
Brochure: "LM494, Pulse Width Modulated Control Circuit", National Semiconductor, 7 pages, Jun. 1989.
Brochure: "High-Efficiency, +5V Adjustable Step-Down Switching Regulator", Maxim Integrated Products, 8 pages, Dec. 1991.
"Notification Concerning Transmittal of International Preliminary Report on Patentability", PCT/US2005/010872, date of mailing Oct. 26, 2006.
Maxim Data sheet for MAX 631/632/633 CMOS Fixed/Adjustable Output Step-Up Switching Regulators (Mar. 1990).
Article: "Getting Maximum Efficiency from a 4-20 mA transducer Power Supply," by Bernhard Konrad of Maxim Integrated Products, Sensors, pp. 74-75, Apr. 1996.
"Notification of Transmittal of the International Search Report and the Written Opinion", PCT/US2005/010872, date of mailing Mar. 27, 2006.
"Notification of Transmittal of the International Search Report and the Written Opinion of the International Searching Authority, or the Declaration", for PCT/US2009/001037 filed Feb. 19, 2009; 17 pages.
First Office Action dated Aug. 19, 2013 in Chinese application No. 20111012474.2, with English Translation, 9 pgs.
Notification of Transmittal of the International Search Report and the Written Opinion of the International Searching Authority, or the Declaration for PCT/US2011/035676 dated May 9, 2011, 9 pages.
Russian First Official Action issued in related Russian Patent Application No. 2012153237, 8 pgs including English Translation.
Canadian Office Action dated Dec. 2, 2013 in related Canadian Patent Appln. No. 2,800,660, 5 pgs.

* cited by examiner

TWO-WIRE INDUSTRIAL PROCESS FIELD DEVICE WITH POWER SCAVENGING

CROSS-REFERENCE TO RELATED APPLICATION

The present application is based on and claims the benefit of U.S. provisional patent application Ser. No. 61/333,508, filed May 11, 2010, the content of which is hereby incorporated by reference in its entirety.

BACKGROUND OF THE INVENTION

The present invention relates to process field devices of the type used to monitor or control an industrial process. Specifically, the present invention relates to process field devices which are powered with power received from a two-wire industrial control loop.

Industrial processes are used in a variety of applications. For example, such systems are used to produce or control process fluids. Examples include oil refineries, food production, paper pulp production, etc. In such industrial processes, process fluids are utilized. Various process variables of the process fluid are monitored or controlled. Examples process variables include temperature, pressure, flow rate, level, etc. In industrial processes, process field devices are used to measure and/or control the process variables. A field device which measures a process variable is often referred to a process variable transmitter. A field device which is used to control a process variable may be referred to a process variable controller.

In many industrial processes, the process field devices are in communication with a centralized location such as a control room. Process variables are transmitted to the control room and equipment in the control room can be used to control the process by transmitting control signals to process variable controllers. Many industrial process installations utilize two-wire industrial process control loops for communication with process field devices. In such a configuration, the current level on the process control loop can be set to a value which represents a measured process variable, or set to value which represents a desired value for controlling a process variable. One example is a two-wire process control loop which operates in accordance with the HART® communication protocol standard. In such a configuration, the current level through the process control loop can be controlled to represent a process variable and additional digital information is transmitted by modulating a digital signal onto the analog current level.

Many process field devices are configured to be powered from the same two-wire process control loop used to transmit information. The two-wire process control loop may couple to a single field device or to multiple field devices ("multidrop"). This limits the power which is available to the process field device. In many instances, it is desirable to maximize the amount of power available to circuitry of the process field device.

SUMMARY

A process field device for use in monitoring or controlling an industrial process includes first and second loop terminals configured to couple to a two-wire industrial process control loop. Field device circuitry is configured to monitor or control a process variable of the industrial process. The field device circuitry is powered by power connections from the two-wire industrial process control loop. A current regulator is connected in series with the two-wire industrial process control loop, the first and second loop terminals and the field device circuitry. The current regulator is configured to control a loop current flowing through the two-wire process control loop. A voltage regulator is connected in parallel with the current regulator and in series with the two-wire industrial process control loop, first and second loop terminals and field device circuitry. The voltage regulator is configured to control a voltage across the field device circuitry.

DETAILED DESCRIPTION

The present invention provides a method and apparatus for recovering, or "scavenging", power from a two-wire process control loop in a process field device. In one configuration, the present invention provides a current regulator and a voltage regulator connected in series with the process control loop and in parallel with one another. Process field device circuitry is coupled in series with the current/voltage regulators and powered with power from the two-wire process control loop. A bulk capacitor can be used in parallel with the process field device circuitry to store power.

Figure 1:
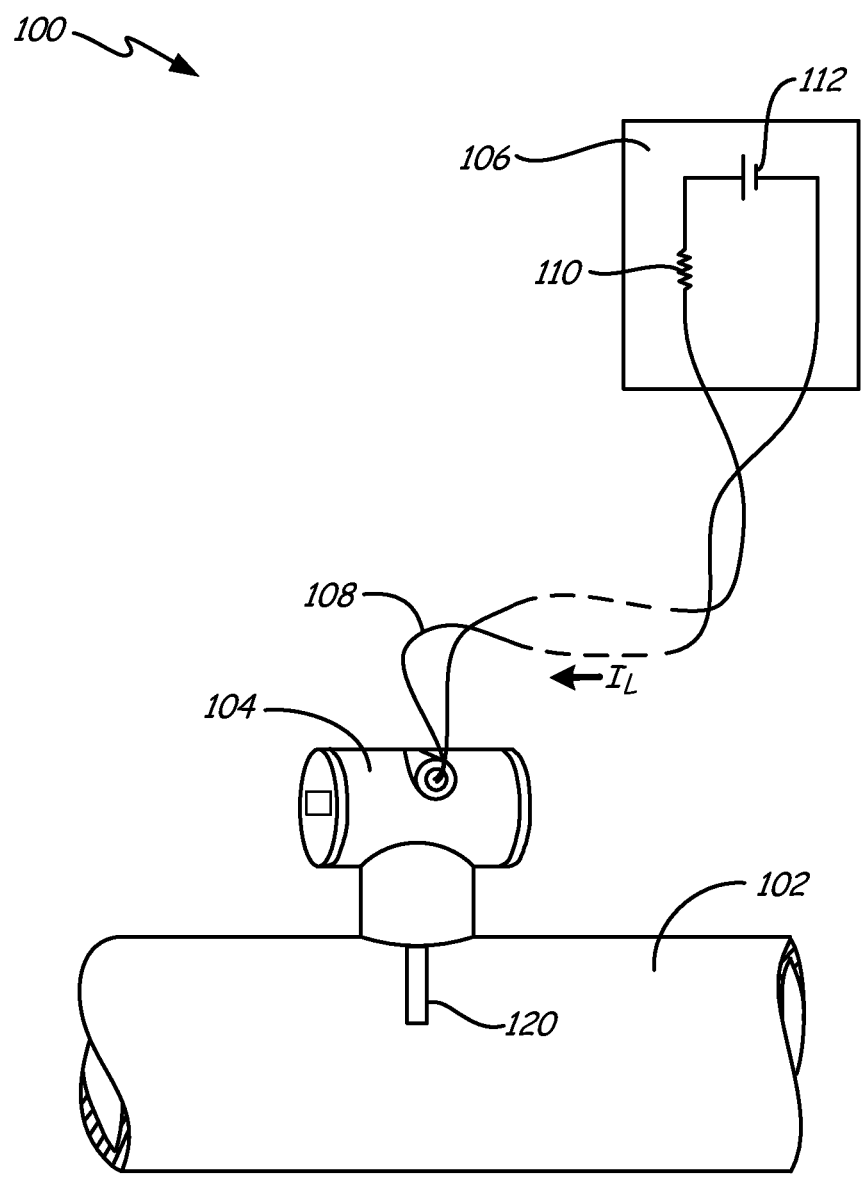
FIG. 1 is a simplified diagram of an industrial process control or monitoring system.

FIG. 1 is a simplified block diagram of an industrial process control or monitoring system 100 configured to control or monitor a process fluid carried in process piping 102. A field device 104 couples to process piping and communicates with a central control room 106 over a two wire process control loop 108. Control 106 is modeled as a resistance 110 and a power supply 112. The two wire process control loop can be in accordance with any appropriate communication protocol. For example, the HART® communication protocol in which a process variable is represented by current $I_L$ flowing through the loop 108 which ranges from a low value of 4 mA to a high value of 20 mA. Digital information can be modulated onto the loop current $I_L$ for transmitting additional information. In another configuration, the process control loop 108 carries only digital information. Field device 104 is illustrated as including a process interface element 120. If field device 104 is configured as a process variable transmitter, process interface element 120 can comprise a sensor such as a pressure sensor, temperature sensor, etc. Similarly, if field device 104 is configured as a process variable controller, process interface 120 can be configured as a control element such as an actuator to control a position of the valve, a heating element, etc.

Figure 2:
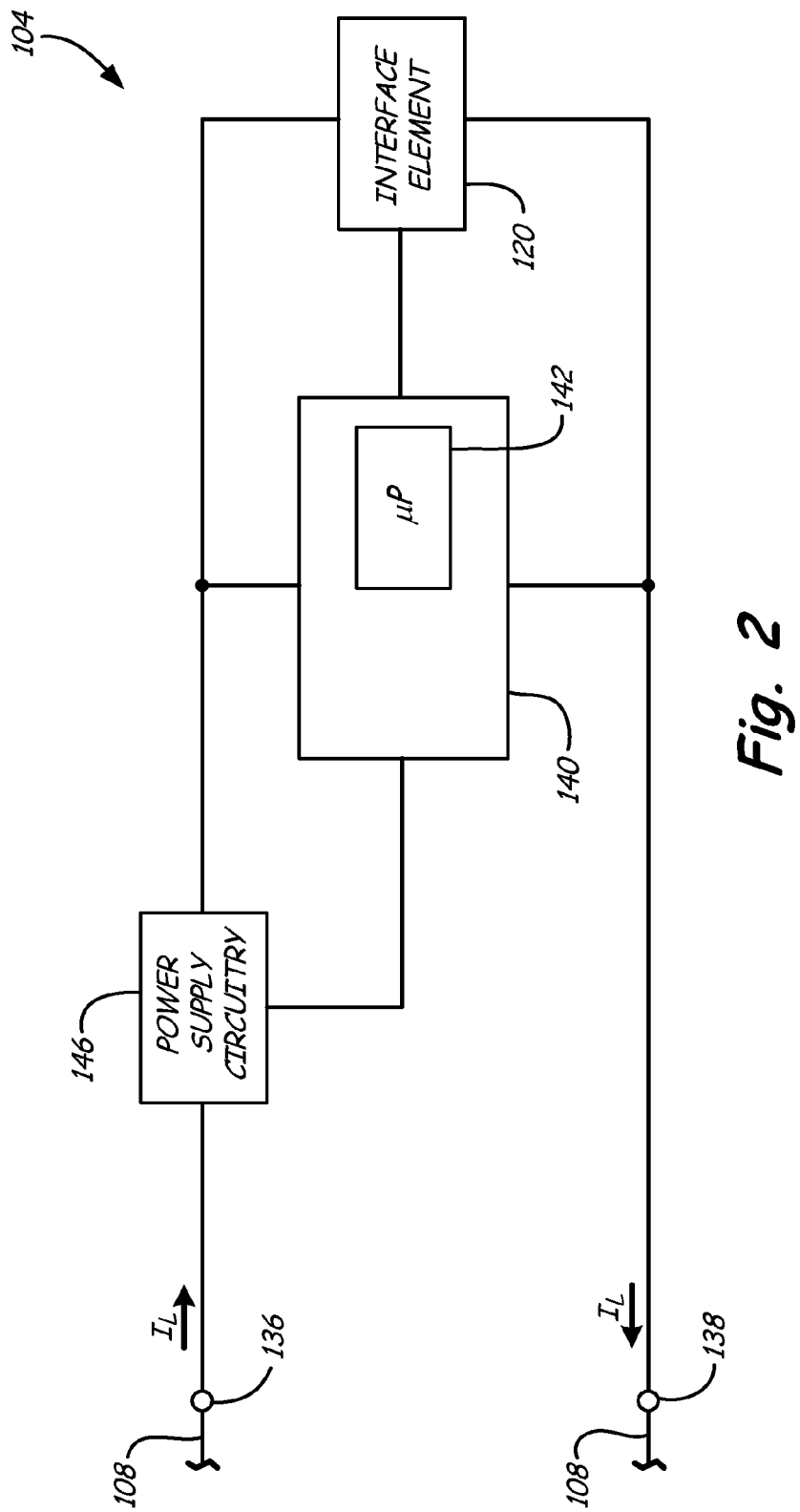
FIG. 2 is a simplified block diagram showing a process field device of FIG. 1.

FIG. 2 is a simplified block diagram showing circuitry of the field device 104. Field device 104 includes field device circuitry 140. Field device 104 includes loop terminals 136 and 138 which are used to couple to the process control loop 108. Field device circuitry 140 includes, for example, a microprocessor 142, as well as other circuitry which is not illustrated. Field device circuitry 140 is used for sensing the process variable from interface element 120 if field device 104 is configured as a process variable transmitter. Similarly, field device circuitry 140 is configured to control the interface element 120 if field device 104 is configured as a process variable controller. Power supply circuitry 146 is illustrated connected in series with the process control loop 108 as explained in more detail below. Power supply circuitry 146 is also used for receiving or transmitting information on the process control loop 108 and is coupled to field device circuitry 140.

As referenced above, during normal operation, the process control loop 108 carries a loop current which ranges between 4 mA and 20 mA. However, some loop powered devices have a low alarm feature which causes the loop current to go offscale low (below 4 mA) in the event of a device failure. The low alarm current may be as low as 3.6 mA. This places a lower limit on quiescent current which may be utilized by the electronic circuit within the device to operate at 3.6 mA or less. The available power is used to power sensors, measurement circuits, regulator circuits, microcontrollers which implement software algorithms, and many other functions.

Figure 3:
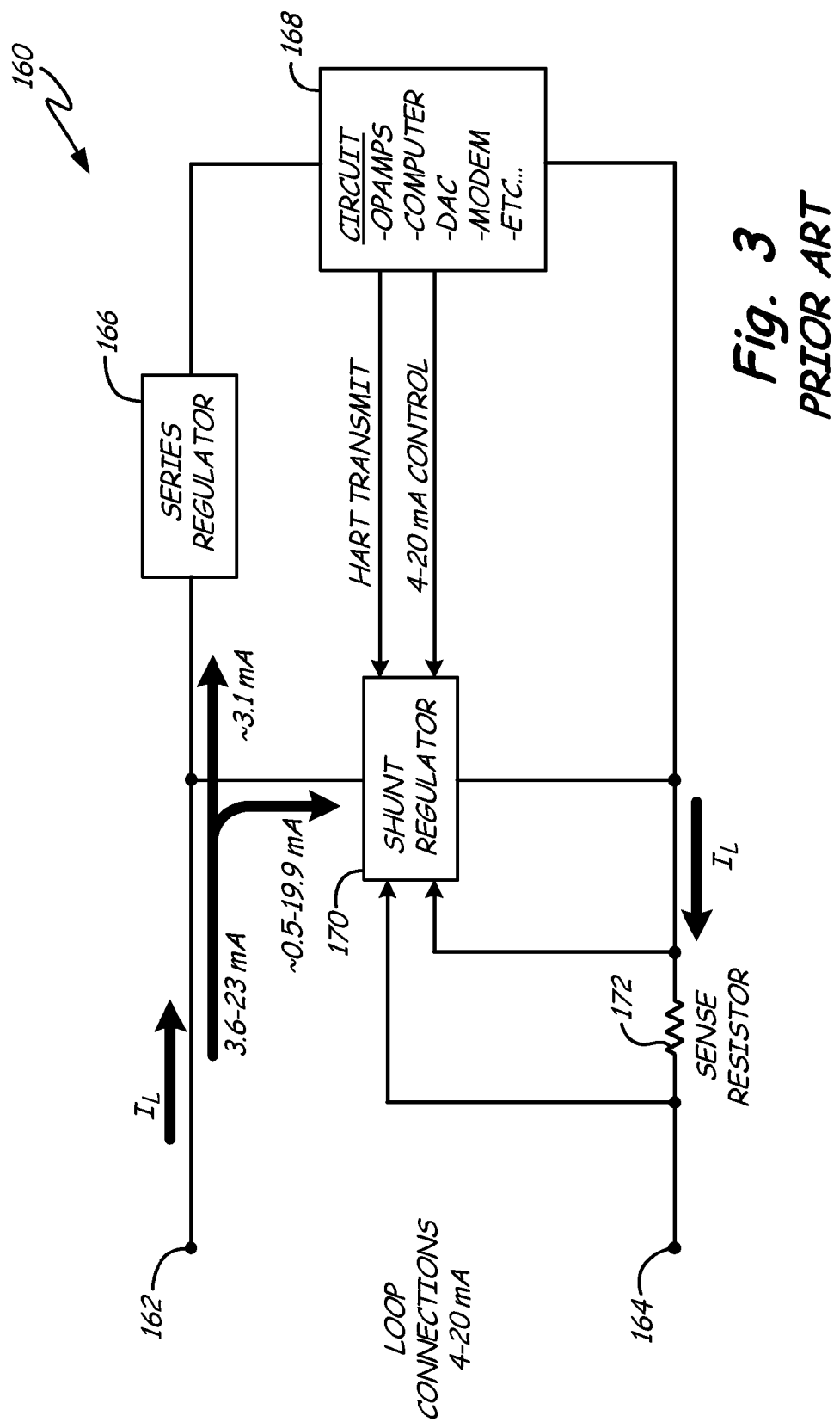
FIG. 3 is a block diagram of a power architecture for a prior art process field device.

Many process devices have an electronic power architecture that employs a series regulator and shunt regulator. FIG. 3 is a simplified schematic diagram of such a prior art configuration in which a field device 160 includes terminals 162 and 164 which couple to the two wire process control loop. A series regulator 166 is connected in series with the process control loop and circuitry 168 of the field device 160. A shunt regulator 170 is connected in parallel with the loop terminals 162 and 164 and is used to shunt current between terminals 162 and 164. A sense resistor 172 provides a voltage to the shunt regulator 170 thereby providing feedback to the shunt regulator 170 related to the loop current $I_L$. The series regulator 166 provides a regulated voltage to the device electronics 168 which include the sensors, A/D's, microcontrollers, etc., The shunt regulator 170 is responsible for controlling the loop current to the desired current level. Regulator 170 receives feedback from the current sense resistor 172 that enables the control of the loop current $I_L$.

The shunt regulator 170 receives an input signal from a digital to analog converter that relates to the DC current level, e.g. the 4-20 mA signal. The regulator 170 receives a second input signal from the HART® communication protocol modem that relates to outgoing (transmitted) HART® communication protocol digital messages. The HART® communication protocol mandates that transmitted messages which are placed on the process control loop have a modulated 1 mA peak to peak current waveform. Thus, the shunt regulator 170 must modulate the loop ±0.5 mA for HART® messages. Increasing the loop current by 0.5 mA is not difficult. However, the shunt regulator 170 cannot impress a negative current on the loop. Therefore, in order to decrease the loop current by 0.5 mA there must be at least 0.5 mA of bias current already passing through the regulator 170. The implication of this is that 0.5 mA out of the available current must be reserved for the shunt regulator 170 to allow HART® communications protocol to function at low alarm current level; this is 14% of the available current. The device 160 is constrained to a current budget of 3.6 mA of which 3.1 mA is allocated to the circuit functions, and 0.5 ma is allocated to biasing the shunt regulator 170.

Figure 4:
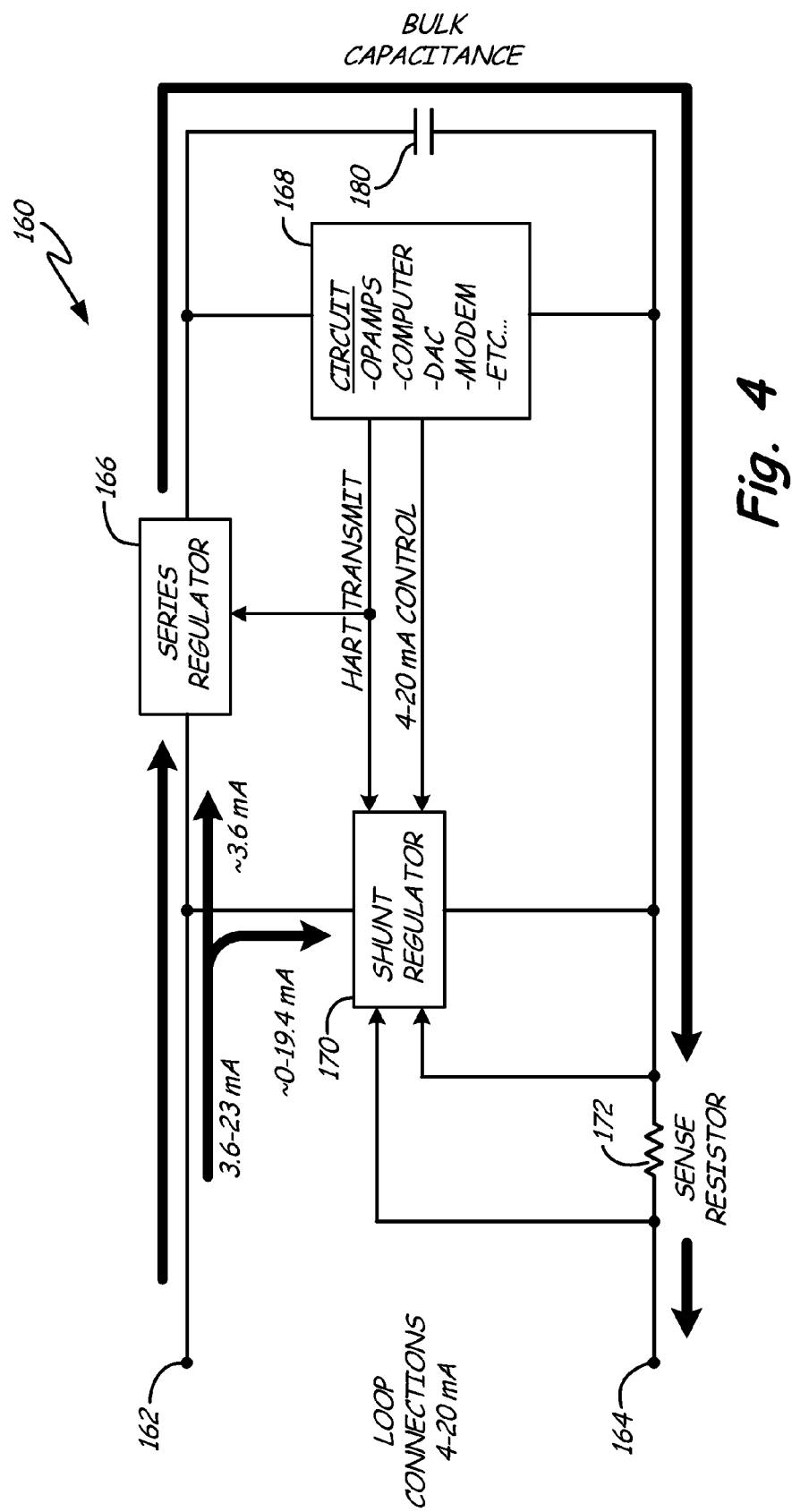
FIG. 4 is a simplified block diagram of power architecture for a prior art process field device employing power scavenging techniques.

One goal of power scavenging is to reduce the 0.5 mA of shunt regulator bias current, and make the current available to the circuitry of the device. This can be done by modulating the HART® communication protocol current in the series regulator path rather than in the shunt regulator path. During the positive half cycle of the HART® communication protocol digital modulation, the excess energy being taken from the loop is stored in bulk capacitors. During the negative half cycle of HART® communication protocol modulation, the energy being taken from the loop is reduced, but it is augmented with the energy stored during the positive half cycle. FIG. 4 is a simplified schematic diagram showing such a configuration. Elements in FIG. 4 which are similar to those shown in FIG. 3 have retained their numbering.

Referring to FIG. 4, the shunt regulator 170 bias current is set to zero, and the entire 3.6 mA of available current is allocated to the series regulator 166. HART® communication protocol transmit messages are supplied to the series regulator 166 causing the current to modulate ±0.5 mA. The current passes through a bulk capacitor 180 connected in parallel with the device circuit 168. This is an acceptable assumption if the bulk capacitor 180 is in the path of least resistance, i.e., the impedance of the bulk capacitor 180 in the HART® communication protocol frequency band is significantly less than the impedance of the circuit 168, or of the shunt regulator 170. These are not difficult design requirements to attain as the impedance of the impedance of the bulk capacitor 180 is typically less than 25 ohm in the HART® communication protocol frequency band.

Note that in the configuration of FIG. 4, the HART® communication protocol transmit signal still passes to the shunt regulator 170. This is done to ensure a good HART® communication protocol transmit waveform on the two wire loop 108. Any imperfection in the HART® communication protocol current waveform passing through the series regulator 166 will be corrected by the shunt regulator 170 thereby resulting in a HART® communication protocol compliant waveform on the loop 108. If the series regulator 166 HART® communication protocol waveform is sufficiently accurate, then the HART® communication protocol transmit signal need not be given to the shunt regulator 170, and the design of the shunt regulator 170 is thereby simplified.

If the series regulator 166 waveform is accurate, then negligible HART® communication protocol transmit current will pass through the shunt regulator 170 and the power scavenging circuit is said to be very efficient; nearly all of the 0.5 mA bias current can be recovered.

However, if the series regulator 166 waveform is not accurate, then significant HART® communication protocol transmit current will pass through the shunt regulator 170 and the power scavenging circuit is said to be inefficient; only a fraction of the 0.5 mA bias current can be recovered.

Figure 5:
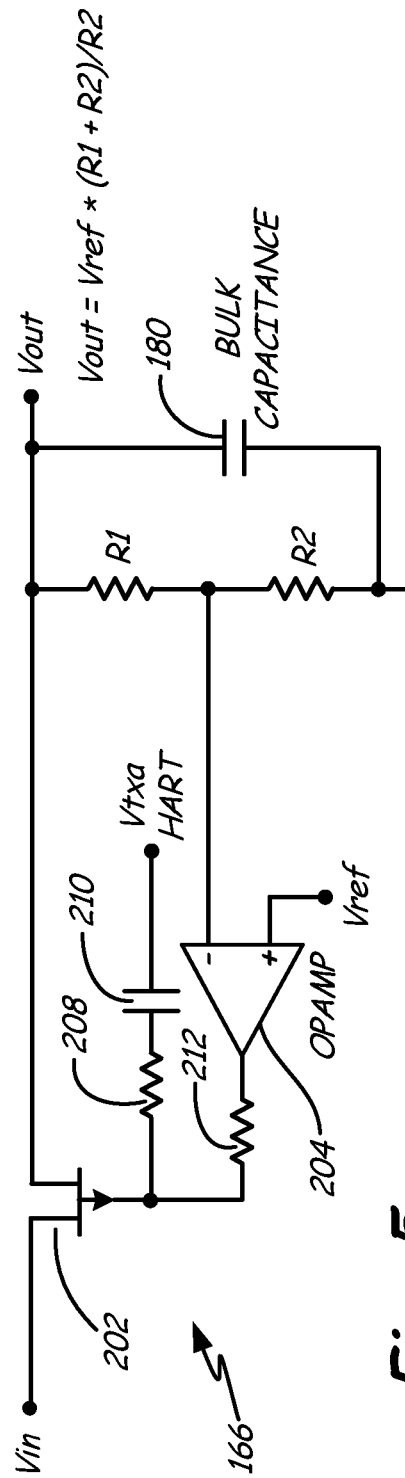
FIG. 5 is an simplified electrical schematic diagram of a prior art series regulator used in the circuitry of FIG. 4.

Prior attempts to implement a HART® communication protocol power scavenging circuit have had limited success. They generally involve the design of a circuit that adds the scavenging function to the series voltage regulator using a single control element. A simplified version of this circuit 166 is given in FIG. 5. In FIG. 5, an operational amplifier 204 controls a field effect transistor 202 based upon negative feedback from the output of FET 202 as determined by resistors R1 and R2. The output from the operational amplifier 204 is provided to transistor 202 through resistor 212. A HART® communication protocol transmit signal is modulated onto the current loop by applying a modulated digital signal to transistor 202 through resistor 208 and capacitor 210. In FIG. 5, the opamp based regulator also accepts the HART® communication protocol transmit control signal for HART® communication protocol scavenging (Vtxa), which causes the loop current to modulate. In this case, the opamp 204 operates as a control element and controls Vout, but not the HART® communication protocol transmit current. In FIG. 5, the HART® communication protocol transmit signal is injected to the gate of FET 202. However, other configurations can be used such as injecting the modulation signal to the node between R1 and R2, or to the Vref node of the opamp 204.

The output voltage Vout is determined by the value of the reference voltage (Vref) and resistors R1 and R2 as given by Equation 1:

$$Vout=Vref*(R1+R2)/R2 \qquad \text{Equation 1}$$

This is a common opamp based voltage regulator architecture that uses a pass transistor 202 in the feedback path. The HART® communication protocol signal is added to the control signal of transistor 202 such that when HART® communication protocol is transmitting 1 mA pk-pk passes through FET 202 and the bulk capacitor 180 to achieve HART® communication protocol power scavenging.

The high gain of the opamp 204 allows for precision control of the output voltage Vout. However, the opamp 204 does not take any role in controlling the current amplitude of the HART® communication protocol transmit waveform. Thus, the precision of the HART® communication protocol waveform depends upon the adjustment of the various resistors and capacitances, and gain characteristics of the active elements such as FET 202. These parameters are not well controlled and consequently the HART® communication protocol transmit waveform is not well controlled. Thus, the efficiency of the HART® communication protocol power scavenging circuit shown in FIG. 5 is relatively poor. Instead of recovering 0.5 mA of bias current from the shunt circuit, a lesser amount is recovered (e.g., 0.1 or 0.2 mA)

The present invention provides a circuit and method that accurately regulates HART® communication protocol transmit current through the series regulator such that improved efficiency of HART® communication protocol scavenging is obtained. However, the configuration still provides adequate design flexibility to address other concerns, such as noise propagation to the loop circuit.

The present invention employs two control elements in the series regulator to achieve both voltage regulation and HART® communication protocol power scavenging current regulation. The use of two separate control elements allows improved control of both parameters: output voltage and HART® communication protocol transmit current.

Figure 6:
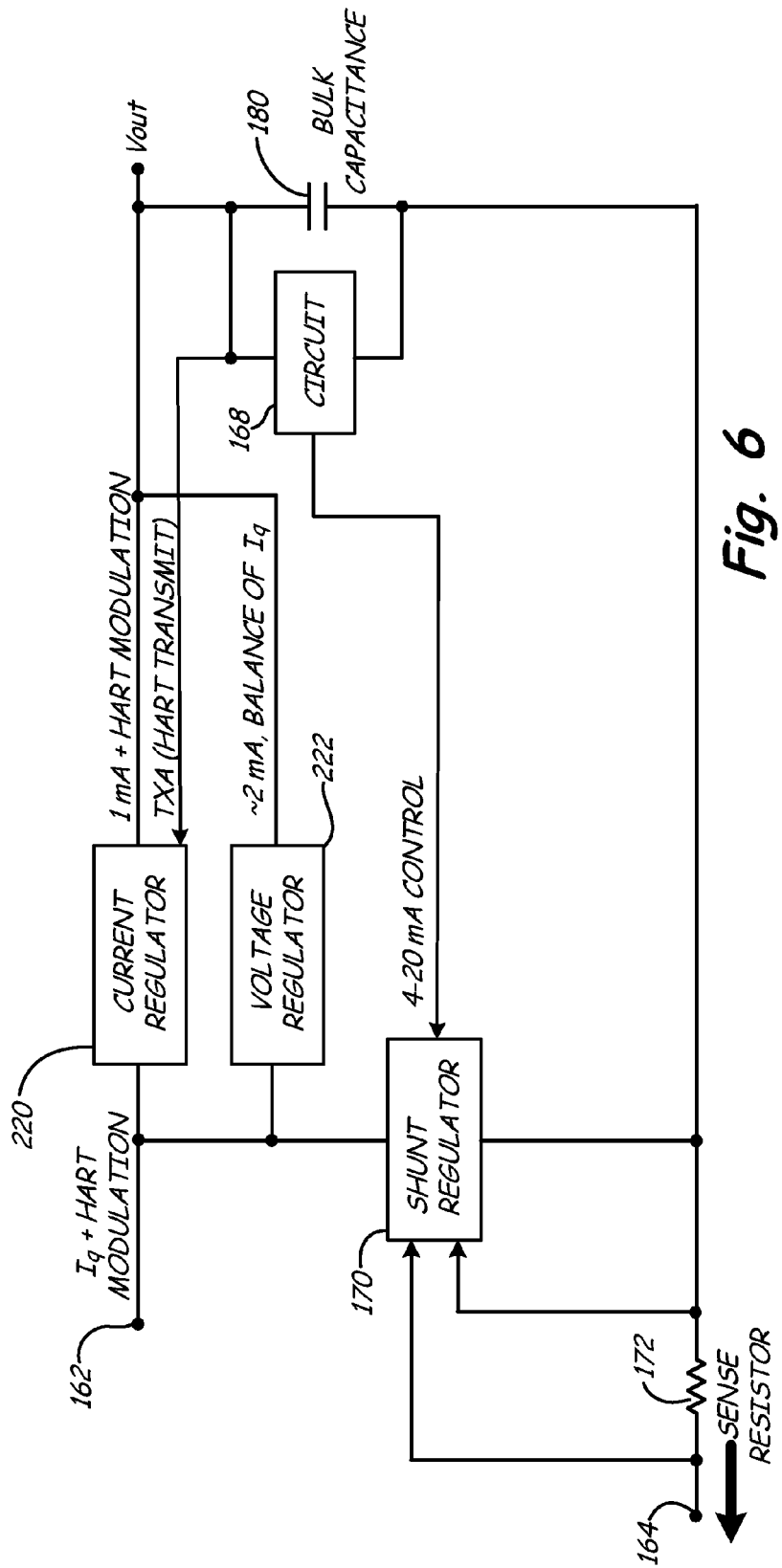
FIG. 6 is a simplified block diagram of power architecture in accordance with the present invention for powering a process field device.

A block diagram of the series regulator is shown in FIG. 6. Elements in FIG. 6 which are similar to previously described elements have retained their numbering. In addition to the shunt regulator 170 described above, the configuration illustrated in FIG. 6 includes a current regulator 220 and voltage regulator 222 connected in parallel as described below in more detail. A voltage regulator 222 controls the output voltage to the desired level. A current regulator 220 is set with a bias current of at least 0.5 mA and preferably 1.0 mA or more. This bias current flows into the circuit 168 so it is not wasted as it is in the shunt regulator configuration of FIG. 3. As the overall quiescent is designed to be at 3 mA or higher this configuration operates properly because there is always current flowing through both regulators 220, 222. For example, with quiescent current at 3 mA there may be 1 mA of bias current in the current regulator 220, and another 2 mA of current in the voltage regulator 222. Quiescent current $I_q$ fluctuations are made up by adjusting the current in the voltage regulator 222.

Although the regulators 220, 222 are connected in parallel, there is no contention between the two because regulator 222 regulates voltage, while regulator 220 regulates current. When a HART® communication protocol message is transmitted, the HART® communication protocol modulation (1 mA pk-pk) is superimposed on 1 mA of bias current in the current regulator 220. Thus, the net output current is the quiescent current $I_q$ and the HART® communication protocol modulation current. Circuit 168 includes a HART® communication protocol modem configured to provide the TXA signal to regulator 220. As described above, circuitry 168 also provides an analog 4-20 mA control signal to the shunt regulator 170.

Figure 7:
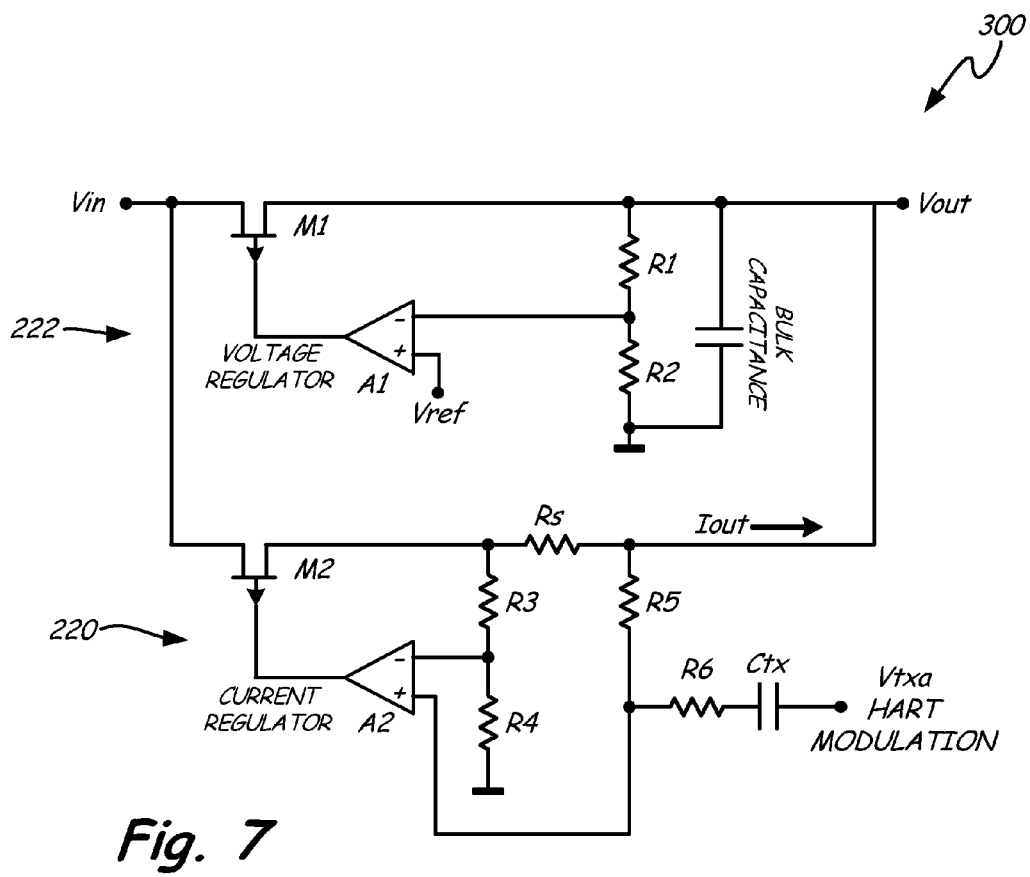
FIG. 7 is an electrical schematic diagram of circuitry of FIG. 6.

A simplified schematic of one example implementation of the series regulator is shown in FIG. 7. Element A1 is the control element for the voltage regulator 222, and element A2 is the control element for the current regulator 220. In the schematic diagram of FIG. 7, the voltage regulator 222 uses a field effect transistor M1 to control the output voltage $V_{out}$. Field effect transistor M1 is controlled using operational amplifier A1 which receives negative feedback which is compared to a voltage reference voltage $V_{ref}$. The negative feedback is based upon resistors R1 and R2. The current $I_{OUT}$ is regulated by current regulator 220 using field effect transistor M2. Field effect transistor M2 is controlled using opamp A2 which receives negative feedback through resistors R3 and R4. A sense resistor $R_S$ is placed in series with M2 to provide a feedback voltage proportional to $I_{OUT}$. A digital signal is modulated onto the current $I_{OUT}$ using the Vtxa input. The amount of modulation can be controlled using resistors R5 and R6.

The voltage regulator output voltage is same as the expression for FIG. 5:

$$Vout = Vref\frac{R1+R2}{R2} \qquad \text{Equation 2}$$

The current regulator 220 bias current is dependent on output voltage Vout, and circuit resistors. HART® communication protocol modulation current is dependent on the transmit signal from the modem (Vtxa), and circuit resistors. Capacitor Ctx is sufficiently large enough such that in the HART® communication protocol band of frequencies its impedance is significantly less than that of resistor R6 which allows it to be ignored for the AC circuit analysis. The output current is given by:

$$Iout = \underbrace{\frac{Vout}{R_s}\frac{R3}{R4}}_{\text{Bias}} + \underbrace{\frac{V_{txa(AC)}}{R_S}\frac{R5}{R5+R6}\frac{R3+R4}{R4}}_{\text{HART Modulation}} \qquad \text{Equation 3}$$

In Equation 3 $V_{txa(AC)}$ designates the AC component of Vtxa since capacitor Ctx blocks the DC component of Vtxa. In the expression of Equation 3 all the parameters are well controlled so that the output current Iout is accurate with respect to the desired bias current (e.g. 1 mA), and the HART® communication protocol modulation current (1 mAp-p). This results in a very efficient HART® communication protocol scavenging design.

Although the present invention has been described with reference to preferred embodiments, workers skilled in the art will recognize that changes may be made in form and detail without departing from the spirit and scope of the invention. Although the above description references the HART® communication protocol, the present invention can be used with other loop communication configurations such as a Foundation Fieldbus™ based communication system.

What is claimed is:

1. A process field device for use in monitoring or controlling an industrial process, comprising:
   first and second loop terminals configured to couple to a two-wire industrial process control loop;
   field device circuitry configured to monitor or control a process variable of the industrial process, the field device circuitry powered by power from the two-wire industrial process control loop;
   a current regulator connected in series with the two-wire industrial process control loop, the first and second loop terminals and the field device circuitry, the current regulator configured to control a loop current flowing through the two-wire process control loop; and
   a voltage regulator connected in parallel with the current regulator and in series with the two-wire industrial process control loop, the first and second loop terminals and field device circuitry, the voltage regulator configured to control a voltage across the field device circuitry.

2. The process field device of claim 1 including a bulk capacitance connected in parallel with the field device circuitry configured to store electrical energy.

3. The process field device of claim 1 including a shunt current regulator configured to control the loop current flowing through the process control loop in response to a measured process variable.

4. The process field device of claim 1 wherein the current regulator is configured to modulate a digital signal onto the loop current flowing through the two-wire industrial process control loop.

5. The process field device of claim 4 wherein the field device circuitry includes a modem coupled to the current regulator configured to modulate the digital signal.

6. The process field device of claim 1 wherein the two wire process control loop operates in accordance with the HART® communication protocol in which digital information is modulated onto an analog current level signal.

7. The process field device of claim 1 wherein the loop current varies between 4 mA and 20 mA and is representative of a measured process variable.

8. The process field device of claim 1 wherein the voltage regulator includes a field effect transistor coupled in series with the two wire process control loop and an operational amplifier having a voltage reference input.

9. The process field device of claim 8 wherein the voltage regulator receives a negative feedback related to a voltage at the output of the field effect transistor.

10. The process field device of claim 1 wherein the current regulator comprises a field effect transistor coupled in series with the two wire process control loop and an operational amplifier configured to receive a modulated digital signal.

11. The process field device of claim 10 wherein the current regulator receives negative feedback related to the current flowing through the field effect transistor.

12. A method of providing power to a process field device for use in monitoring or controlling an industrial process, comprising:
   coupling first and second loop terminals to a two wire industrial process control loop;
   powering field device circuitry with power received from the two wire process control loop and monitoring or controlling a process variable of the industrial process with the field device circuitry;
   regulating a loop current flow through the two wire process control loop using a current regulator which is coupled in series with the first and second loop terminals and the field device circuitry; and
   regulating a voltage across the field device circuitry using a voltage regulator connected in parallel with the current regulator and in series with the two wire process control loop, the first and second loop terminals and the field device circuitry.

13. The process field device of claim 12 including providing a bulk capacitance connected in parallel with the field device circuitry configured to store electrical energy.

14. The process field device of claim 12 including controlling the loop current flowing through the process control loop with a shunt current regulator in response to a measured process variable.

15. The method of claim 12 including modulating a digital signal onto the loop current flowing through the two-wire industrial process control loop.

16. The method of claim 12 wherein the voltage regulator includes a field effect transistor coupled in series with the two wire process control loop and an operational amplifier having a voltage reference input.

17. The method of claim 16 wherein the voltage regulator receives a negative feedback related to the current flowing through the field effect transistor.

18. The method of claim 12 wherein the current regulator comprises a field effect transistor coupled in series with the two wire process control loop and an operational amplifier configured to modulate a digital signal on to the two wire process control loop.

* * * * *